United States Patent
Cheong et al.

(10) Patent No.: US 8,200,998 B2
(45) Date of Patent: Jun. 12, 2012

(54) METHOD OF CONTROLLING POWER SAVING MODE USED IN SATA INTERFACE

(75) Inventors: Woo-seong Cheong, Yongin-si (KR); Sang-kyoo Jeong, Seoul (KR); Tae-min Jeong, Yongin-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 836 days.

(21) Appl. No.: 12/021,680

(22) Filed: Jan. 29, 2008

(65) Prior Publication Data
US 2008/0184051 A1 Jul. 31, 2008

(30) Foreign Application Priority Data
Jan. 30, 2007 (KR) .................. 10-2007-0009423

(51) Int. Cl.
*G06F 1/26* (2006.01)
*G06F 1/32* (2006.01)

(52) U.S. Cl. ........................... 713/320; 713/310

(58) Field of Classification Search ............ 710/14; 713/300, 310, 320, 323, 324
See application file for complete search history.

(56) References Cited

U.S. PATENT DOCUMENTS

| | | | |
|---|---|---|---|
| 7,111,158 B1 * | 9/2006 | Burroughs et al. ............ 713/1 |
| 7,234,067 B2 * | 6/2007 | Burton .......................... 713/320 |
| 7,328,356 B2 * | 2/2008 | Igari ............................. 713/320 |
| 7,330,989 B2 * | 2/2008 | Bashford et al. ............. 713/323 |
| 7,472,298 B1 * | 12/2008 | Kimmel et al. ............... 713/320 |
| 7,613,525 B2 * | 11/2009 | Ogasawara et al. ............ 700/1 |
| 2004/0268170 A1 | 12/2004 | Ayyavu et al. |
| 2005/0138441 A1 * | 6/2005 | Huffman et al. ............. 713/300 |
| 2005/0169356 A1 * | 8/2005 | Matsumoto et al. ......... 375/220 |
| 2006/0129703 A1 * | 6/2006 | Oshikawa et al. ............. 710/14 |
| 2006/0265617 A1 * | 11/2006 | Priborsky ..................... 713/320 |

FOREIGN PATENT DOCUMENTS

| | | |
|---|---|---|
| JP | 2005-78514 | 3/2005 |
| JP | 2005-190202 | 7/2005 |
| JP | 2005-339135 | 12/2005 |
| JP | 2006-164012 | 6/2006 |

OTHER PUBLICATIONS

Japanese Office Action issued on Apr. 17, 2012 in JP Application No. 2008-018086.

* cited by examiner

*Primary Examiner* — Paul R Myers
*Assistant Examiner* — Trisha Vu
(74) *Attorney, Agent, or Firm* — Stanzione & Kim, LLP

(57) ABSTRACT

A method of controlling a power saving mode used in a serial advanced technology attachment (SATA) interface. The method of controlling a power saving mode used in a SATA interface for data transmission between a transmitter and a receiver includes: requesting the receiver to enter one of a plurality of power saving modes in a SATA protocol using the transmitter; and selecting one of the power saving modes using the receiver. In the method of controlling a power saving mode in a SATA interface, since a power saving mode can be selected independently of a power saving mode requested by a transmitter, a system can operate in a power saving mode that is suitable for the required properties of the system in accordance with a SATA protocol. Furthermore, the properties of the system required by a user can be realized by selecting a user-defined power saving mode.

21 Claims, 9 Drawing Sheets

FIG. 1 (CONVENTIONAL)

FIG. 2 (CONVENTIONAL)

FIG. 3 (CONVENTIONAL)

FIG. 7

METHOD OF CONTROLLING POWER SAVING MODE USED IN SATA INTERFACE

CROSS-REFERENCE TO RELATED APPLICATIONS

This application claims the benefit of Korean Patent Application No. 10-2007-0009423, filed on Jan. 30, 2007, in the Korean Intellectual Property Office, the disclosure of which is incorporated herein in its entirety by reference.

BACKGROUND OF THE INVENTION

1. Field of the Invention

The present general inventive concept relates to a power management method of a semiconductor device, and more particularly, to a method of controlling a power saving mode, and a power management method used in a serial advanced technology attachment (SATA) interface.

2. Description of the Related Art

A serial advanced technology attachment (SATA) protocol on an interface for data transmission between a host and a device supports a power saving mode in order to reduce power consumption for a SATA interface method. The host, such as a motherboard or an interface card, serves as an interface in a personal computer, and the device, such as a hard disk drive (HDD), serves as data storage.

Figure 1:
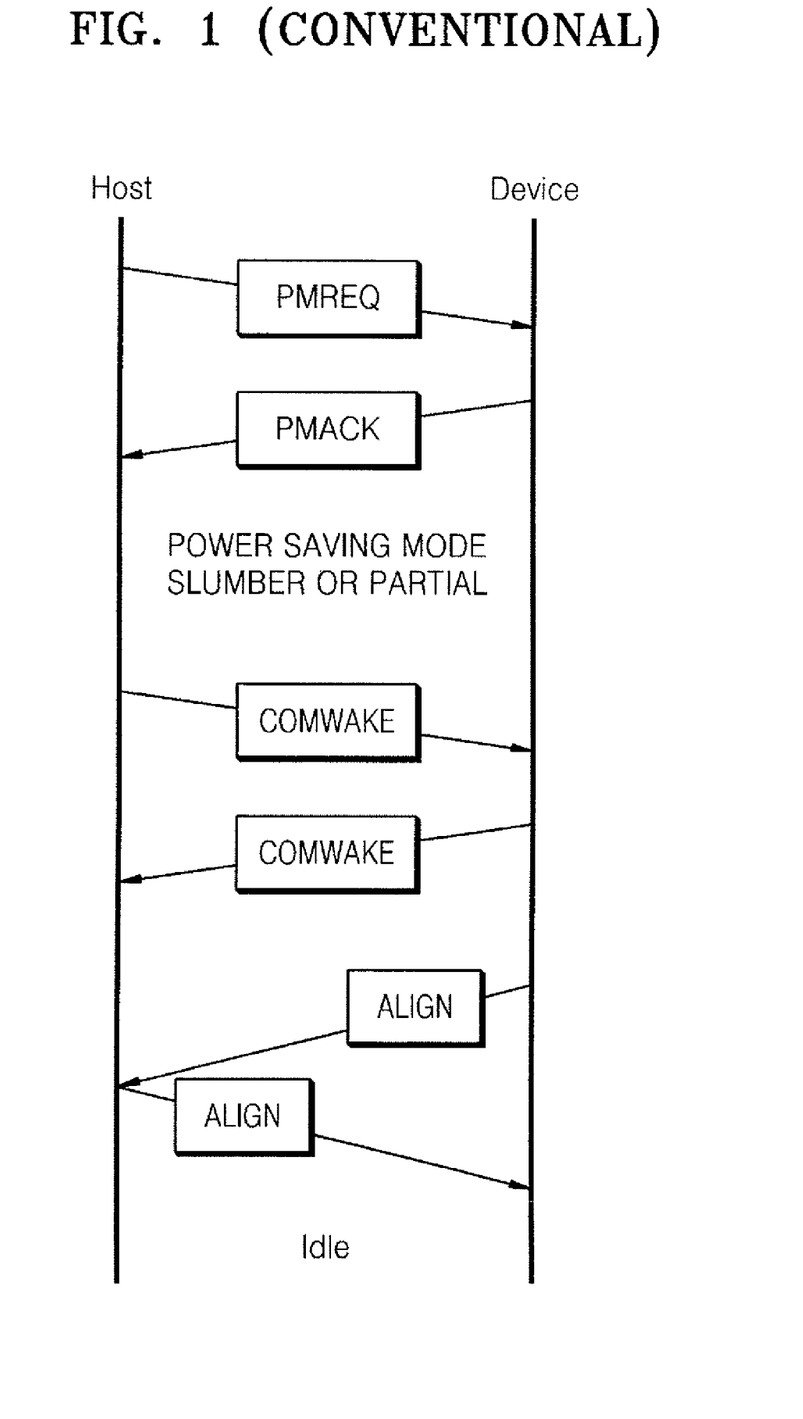
FIG. 1 is a data flow diagram of a power saving method used in a serial advanced technology attachment (SATA) interface in response to a request of a host to enter a power saving mode.
Figure 2:
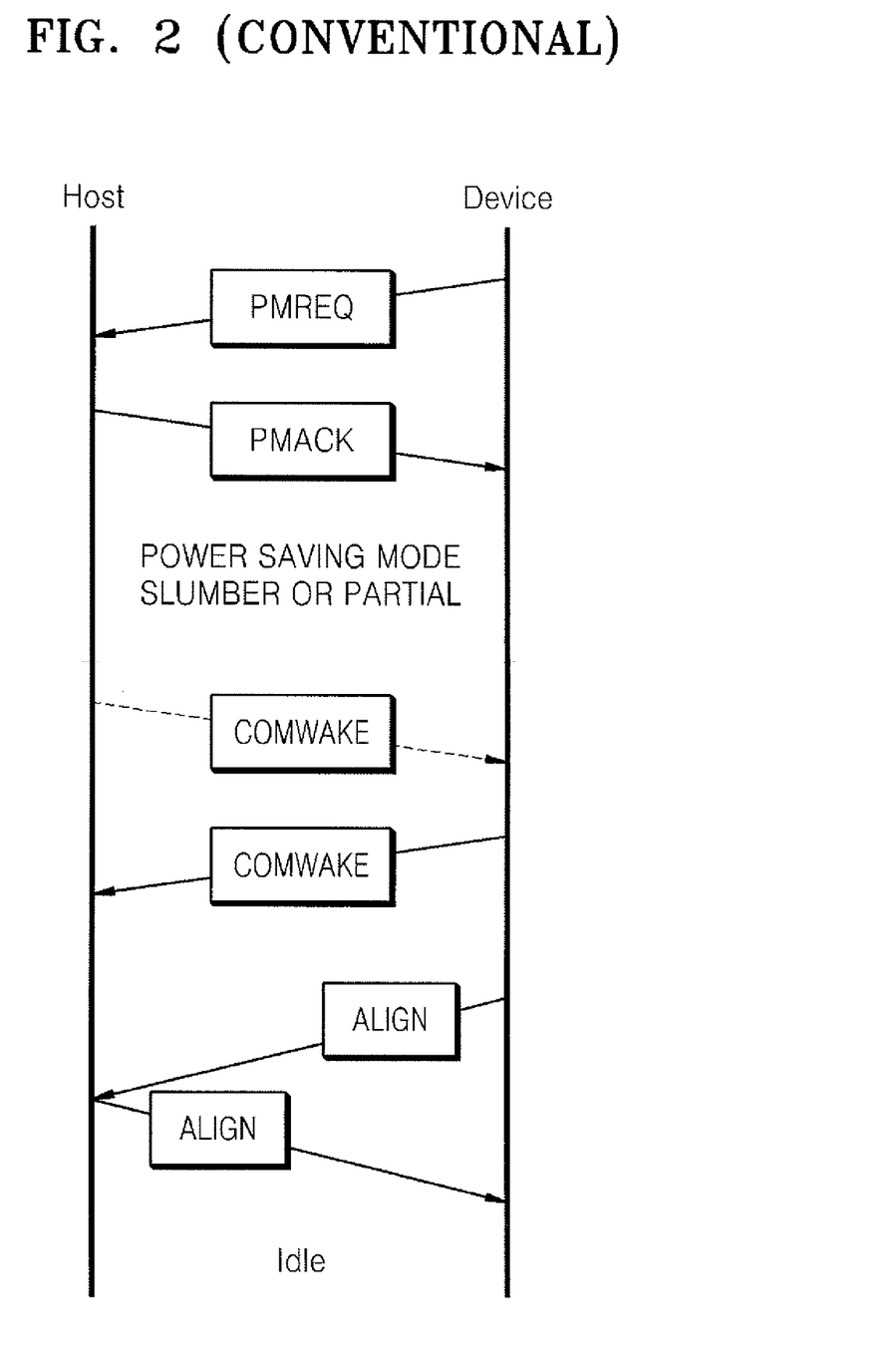
FIG. 2 is a data flow diagram of a power saving method used in a SATA interface in response to a request of a device to enter a power saving mode.

Referring to FIGS. 1 and 2, a power saving method according to the SATA protocol will be described below. A host or a device that is to enter a power saving mode transmits a power saving mode request signal (defined as expand the meaning of this acronym here PMREQ_P signal and expand the meaning of this acronym here PMREQ_S signal in the SATA protocol, and illustrated as the PMREQ signal in FIGS. 1 and 2) to the device or the host. Hereinafter, a side that transmits the PMREQ signal will be referred to as a transmitter, and a side that receives the PMREQ signal will be referred to as a receiver.

FIG. 1 is a data flow diagram of a power saving method when a host is a transmitter and a device is a receiver, and FIG. 2 is a data flowchart of a power saving method when a device is transmitter and a host is a receiver. The transmitter, as described above, transmits the PMREQ signal to the receiver. After receiving the PMREQ signal, the receiver transmits a PMACK signal in the SATA protocol to the transmitter when it is possible to enter the power saving mode, or transmits a PMNCK signal in the SATA protocol (not shown) to the transmitter when it is not possible to enter the power saving mode.

When the transmitter receives the PMACK signal, the transmitter and the receiver enter the power saving mode by turning off some or all PHY blocks of the transmitter and the receiver. In this case, a PHY block is a block defined in a SATA interface standard and denotes a physical layer. The PHY blocks are control blocks provided in the transmitter and the receiver for the SATA interface and may be classified as a block for controlling data transmission and reception, a PLL block, a block for generating finite state machine and clock, and the like depending on functions of the PHY blocks.

A system maintains the power saving mode until the transmitter or the receiver transmits a request for an end of the power saving mode through a COMWAKE signal of SATA protocol. Referring to FIG. 1, as the device transmits the COMWAKE signal to the host in response to the COMWAKE signal of the host, the power saving mode ends. Then, the host and the device enter an idle mode in order to prepare for data transmission and reception.

On the other hand, referring to FIG. 2, as the device transmits the COMWAKE signal to the host, the power saving mode ends. Hence, the host may request for the end of the power saving mode first through the COMWAKE signal that is represented by the dotted line in FIG. 2.

The SATA protocol supports two types of power saving modes: a slumber mode and a partial mode. According to the SATA standard, the slumber mode has a wake-up time of 10 ms, and the partial mode has a wake-up time of 10 us.

The partial mode turns off fewer PHY blocks as compared with the slumber mode, and thus, has a wake-up time faster than that of the slumber mode. The partial mode may turn off only PHY blocks associated with the above-described data transmission and reception, and the slumber mode may turn off more PHY blocks such that the faster wake-up time can be realized in the partial mode. Hence, a fast wake-up response can be realized in the partial mode as compared to the slumber mode, and more power can be saved in the slumber mode as compared to the partial mode.

The transmitter predicts the required time to request the receiver to enter one of the partial mode and the slumber mode. The receiver turns off the PHY blocks corresponding to the received mode such that the transmitter and the receiver enter the power saving mode as described above.

Figure 3:
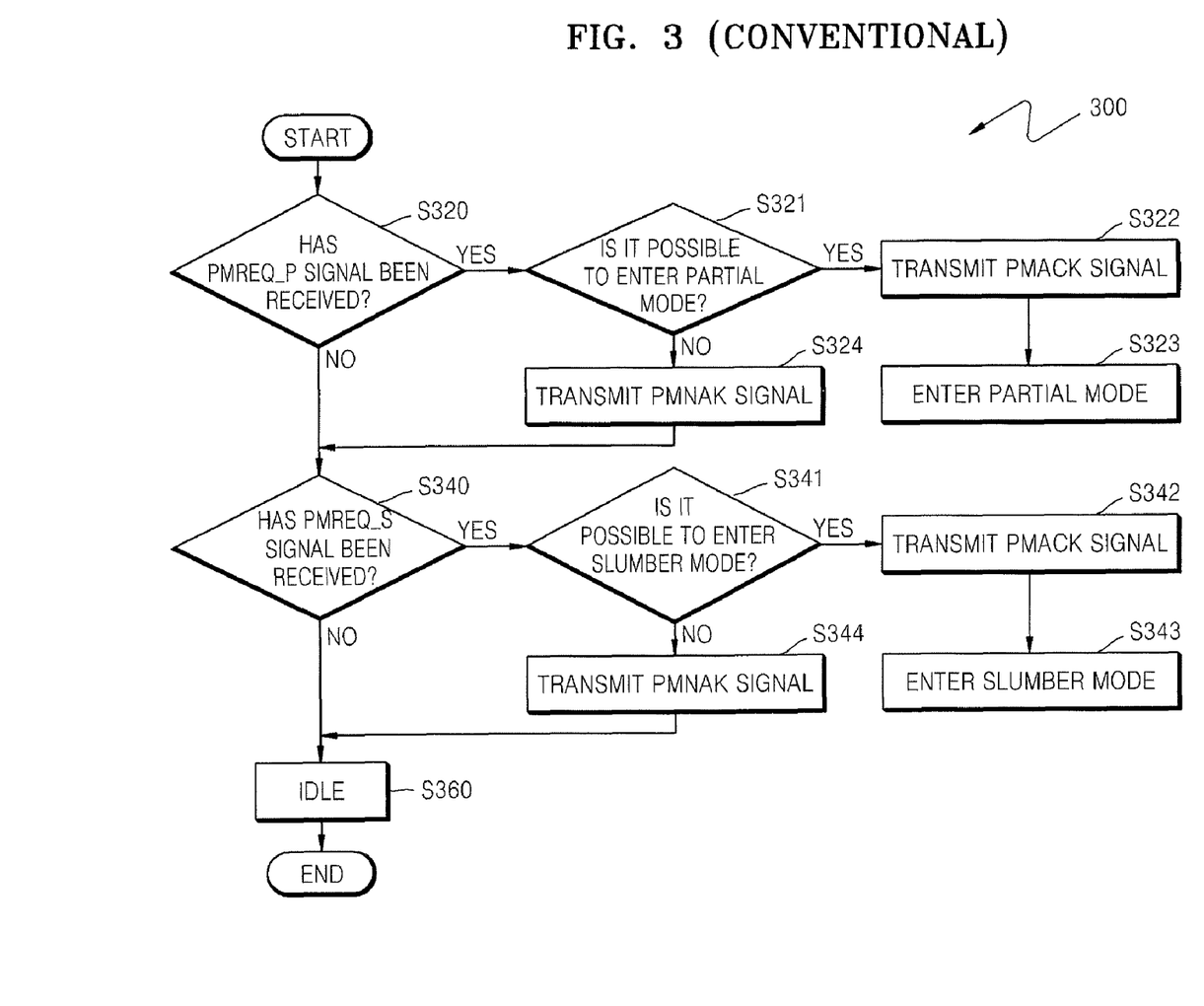
FIG. 3 is a flowchart of a method of controlling a power saving mode in a SATA protocol according to related art.

FIG. 3 is a flowchart of a power saving method 300 in a SATA protocol according to related art.

Referring to FIG. 3, whether the receiver has received the PMREQ_P signal in operation S320 is determined. The transmitter transmits the PMREQ_P signal in the partial mode, and transmits the PMREQ_S signal in the slumber mode. When the PMREQ_P signal is received by the receiver, the receiver checks whether it is possible to enter the partial mode in operation S321 in order to transmit the PMACK signal to the transmitter when it is possible to enter the partial mode, in operation S322, and transmits the PMNAK signal to the transmitter when it is not possible to enter the partial mode, in operation S324. When the transmitter receives the PMACK signal, the system enters the partial mode in operation S323.

When the PMREQ_P signal is not received by the receiver, whether the receiver received the PMREQ_S signal is checked, in operation S340. When the PMREQ_S signal is received by the receiver, the receiver checks whether it is possible to enter the slumber mode in operation S341 in order to transmit the PMACK signal to the transmitter when it is possible to enter the slumber mode, in operation S342, and transmits the PMNAK signal to the transmitter when it is not possible to enter the slumber mode, in operation S344. When the transmitter receives the PMACK signal, the system enters the slumber mode in operation S343.

When the power saving mode is not requested, that is, when neither the PMREQ_P signal nor the PMREQ_S signal is received, the transmitter and the receiver stays in the idle mode in operation S360.

However, the properties required of a system should be realized independently of the requested power saving mode. In detail, it is necessary to enter the slumber mode in order to reduce power consumption although the partial mode is requested. Similarly, it is necessary to enter the partial mode in order to improve the wake-up response although the slumber mode is requested. Thus, it may be necessary to operate in another mode besides the partial mode and the slumber mode depending on the properties of the system.

SUMMARY OF THE INVENTION

The present general inventive concept provides a method of controlling a power saving mode used in a serial advanced technology attachment (SATA) interface capable of adaptively selecting a power saving mode depending on required properties of a system.

Additional aspects and utilities of the present general inventive concept will be set forth in part in the description which follows and, in part, will be obvious from the description, or may be learned by practice of the general inventive concept.

The foregoing and/or other aspects and utilities of the present inventive concept are achieved by providing a method of controlling a power saving mode used in a serial advanced technology attachment (SATA) interface for data transmission between a transmitter and a receiver, the method comprising: requesting the receiver to enter one of a plurality of power saving modes in a SATA protocol using the transmitter; and selecting one of the power saving modes using the receiver.

In the requesting to enter the power saving mode, it may be requested to enter one of first, second and third power saving modes. The first power saving mode may have a wake-up time less than a wake-up time of the second power saving mode.

The first power saving mode may be a partial mode. The second power saving mode may be a slumber mode.

In selecting of the power saving mode, the power saving mode may be selected in response to a control signal independently of which mode is requested. The control signal may be set in order to select the second power saving mode when a system in the SATA interface requires more power saving than the first power saving mode, and may be set to select the first power saving mode when the system requires a faster wake-up response than the second power saving mode. The control signal may be set by a user or is automatically set by the system.

In selecting of the power saving mode, the power saving mode may be selected in response to a control signal independently of which mode is requested. The third power saving mode may be a mode to turn off only transmission and reception between the transmitter and the receiver. The control signal may be set to select the second power saving mode when a system using the SATA interface requires more power to be saved than the first power saving mode, may be set to select the first power saving mode when the system requires a faster wake-up response than the second power saving mode, and may be set to select the third power saving mode when the system requires a more stable operation than the first and second power saving modes.

The method may further comprise checking whether it is possible to enter the selected power saving mode. The checking of whether it is possible to enter the selected power saving mode may comprise: transmitting a PMACK signal in the SATA protocol to the transmitter using the receiver when it is possible to enter the selected power saving mode; and transmitting a PMNAK signal in the SATA protocol to the transmitter using the receiver when it is not possible to enter the selected power saving mode.

The method may further comprise: entering the selected power saving mode when the transmitter receives the PMACK signal; and entering an idle mode when the transmitter receives the PMNAK signal.

The transmitter and the receiver may be a host and a device, or a device and a host, respectively. The device may be one of a flash memory device and a hard disk drive.

The foregoing and/or other aspects and utilities of the present inventive concept may also be achieved by providing a power management method used in a serial advanced technology attachment (SATA) interface for data transmission between a transmitter and a receiver, the method comprising: requesting the receiver to enter one of a plurality of power saving modes in a SATA protocol using the transmitter; selecting one of the power saving modes using the receiver; checking whether it is possible to enter the selected power saving mode; and entering the selected power saving mode when it is possible to enter the selected power saving mode.

The foregoing and/or other aspects and utilities of the present inventive concept may also be achieved by providing a power management method used in a serial advanced technology attachment (SATA) interface for data transmission between a transmitter and a receiver, the method comprising: determining whether a request by the transmitter has be made to enter one of a plurality of power saving modes in a SATA protocol; determining whether an independent selection of a power mode had be made; and entering one of the power modes from the requested power modes of the transmitter and the selected power mode based on a condition of the SATA protocol.

The independent selection of a power mode can be made in response to a control signal received by the receiver.

The control signal may be set by a user, or may be automatically set by the system.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 4:
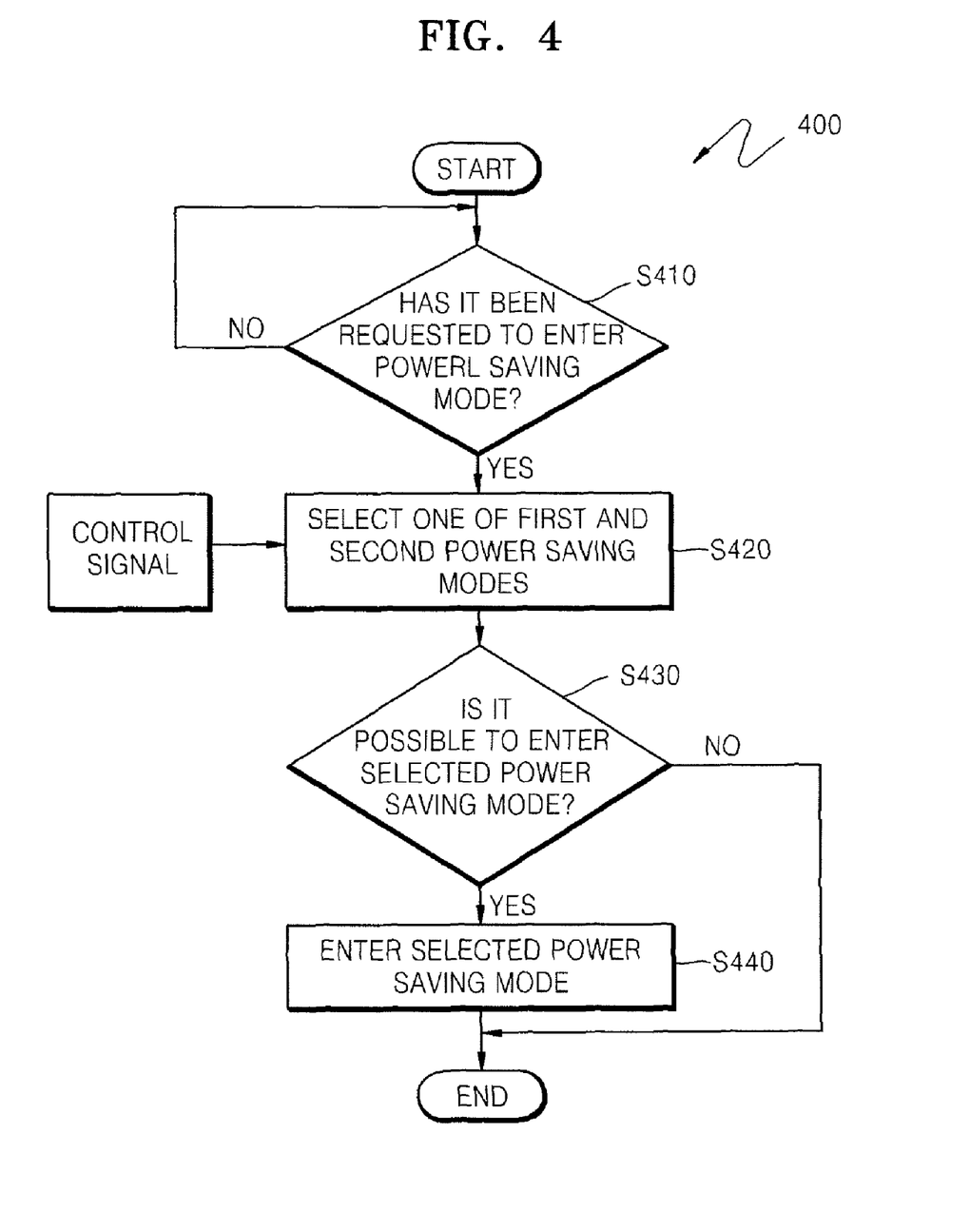
FIG. 4 is a flowchart of a method of controlling a power saving mode in a SATA protocol, according to an embodiment of the present invention.

FIG. 4 is a flowchart of a method 400 of controlling a power saving mode in a serial advanced technology attachment (SATA) protocol, according to an embodiment of the present general inventive concept.

Referring to FIG. 4, according to the method 400 of controlling a power saving mode, in a SATA interface for data transmission between a transmitter and a receiver, the transmitter requests the receiver to enter one of a plurality of power saving modes in a SATA protocol in operation S410. Then, in operation S420, the receiver selects one of the power saving modes.

In operation S410, the transmitter requests the receiver to enter one of a first power saving mode and a second power saving mode. The first power saving mode may have a wake-up time less than that of the second power saving mode. For example, the first and second power saving modes may be a partial mode and a slumber mode, respectively. Hereinafter, the first saving mode will be referred to as the partial mode, and the second power saving mode will be referred to as the slumber mode.

The transmitter and the receiver may be a host and a device, respectively. In particular, the device may be a storage device including a flash memory or a hard disk drive including a disk device.

In operation S420, the receiver selects one of the partial mode and the slumber mode independently of which power saving mode from among the partial mode and the slumber mode is requested by the transmitter to enter. In operation S420, the receiver may select the power saving mode in response to a control signal.

The control signal may be set by a user, or may be automatically set by the system. In the present embodiment, the control signal is set to select the slumber mode when the system using the SATA interface requires more power saving as compared with the partial mode. Also, the control signal is set to select the partial mode when the system requires a faster wake-up response as compared with the slumber mode.

Still referring to FIG. 4, the method 400 of controlling a power saving mode may further include operation S430 in order to check whether it is possible to enter the selected power saving mode. In operation S430, if it is possible to enter the selected power saving mode, the receiver transmits a PMACK signal in the SATA protocol to the transmitter. If it is not possible to enter the selected power saving mode, the receiver transmits a PMNAK signal in the SATA protocol to the transmitter. Hereinafter, the method 400 of controlling a power saving mode of FIG. 4 will be described more fully with reference to exemplary embodiments illustrated in FIGS. 5A-5B and 6A-6B, respectively.

FIGS. 5A-5B and 6A-6B are flowcharts of exemplary embodiments 500 and 600 of controlling the power saving mode method of FIG. 4. A description of modes and communication terms used below are related to the field of the invention and the description of the related art.

Figure 5A:
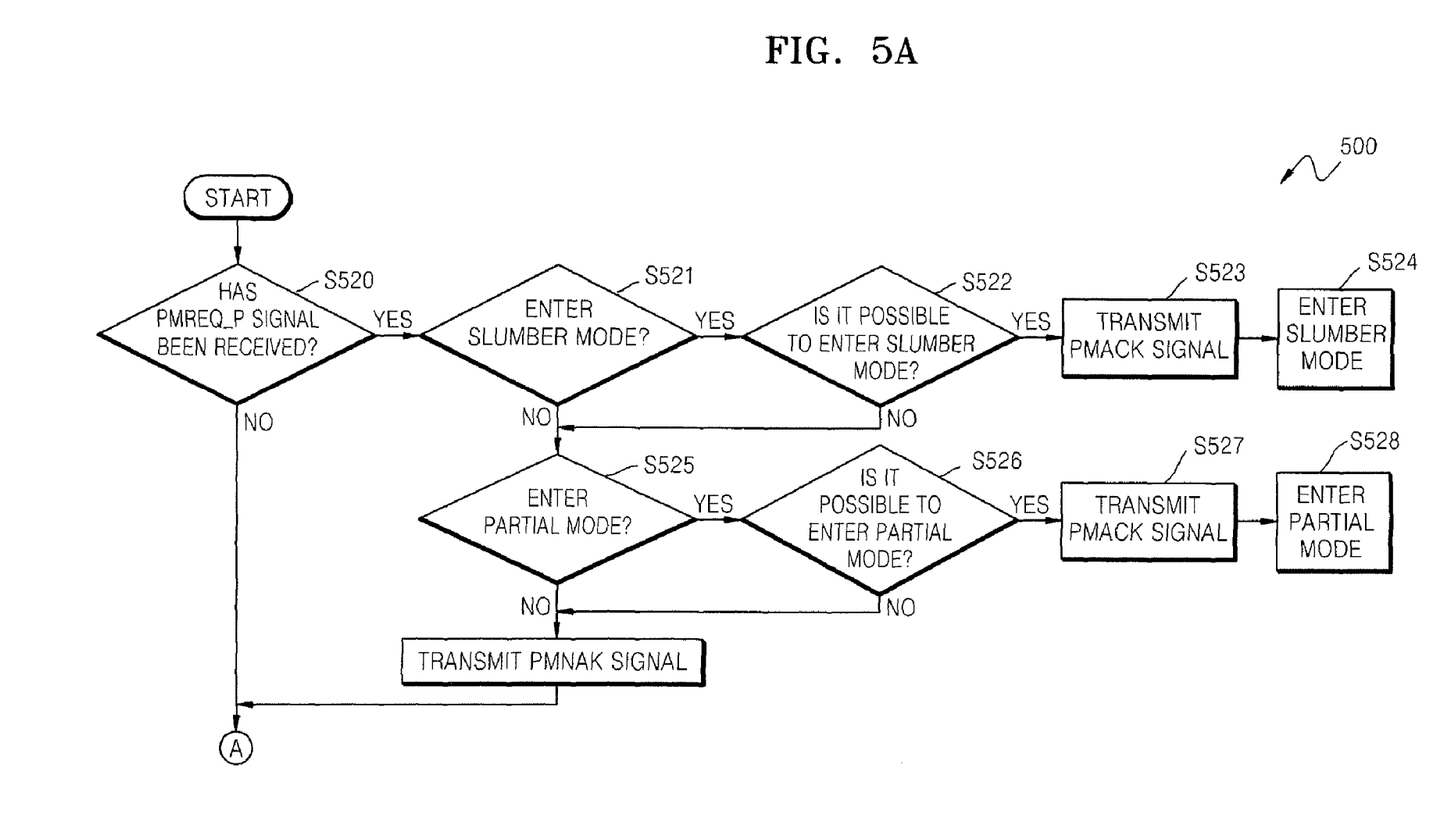
FIGS. 5A-5B and 6A-6B are flowcharts of various exemplary embodiments of the method of controlling the power saving mode as illustrated in FIG. 4.

Referring to FIG. 5A, in the operations of the exemplary embodiment 500 of controlling a power saving mode, when a PMREQ_P signal is received by the receiver, in operation S520, the receiver determines whether to enter the slumber mode in operation S521 or to enter the partial mode in operation S525. If the receiver decides to enter the slumber mode in operation S521, the receiver checks whether it is possible to enter the slumber mode in operation S522. This decision by the receiver can be caused by an external control signal received, for example, by a user or automatically set by the system, as described with reference to FIG. 4 supra. If it is possible to enter the slumber mode in operation S522, the receiver transmits a PMACK signal to the transmitter in operation S523. When the transmitter receives the PMACK signal from the receiver, the transmitter and the receiver enter the slumber mode in operation S524. In this case, even if the partial mode is requested in operation S520, the transmitter and the receiver enter the slumber mode in operation S524, and thereby, further improving power efficiency of the system.

On the other hand, if the receiver decides to enter the partial mode in operation S525, the receiver checks whether it is possible to enter the partial mode in operation S526. If it is possible to enter the partial mode in operation S526, the receiver transmits the PMACK signal to the transmitter in operation S527. When the transmitter receives the PMACK signal from the receiver, the transmitter and the receiver enter the partial mode in operation S528.

Figure 5B:
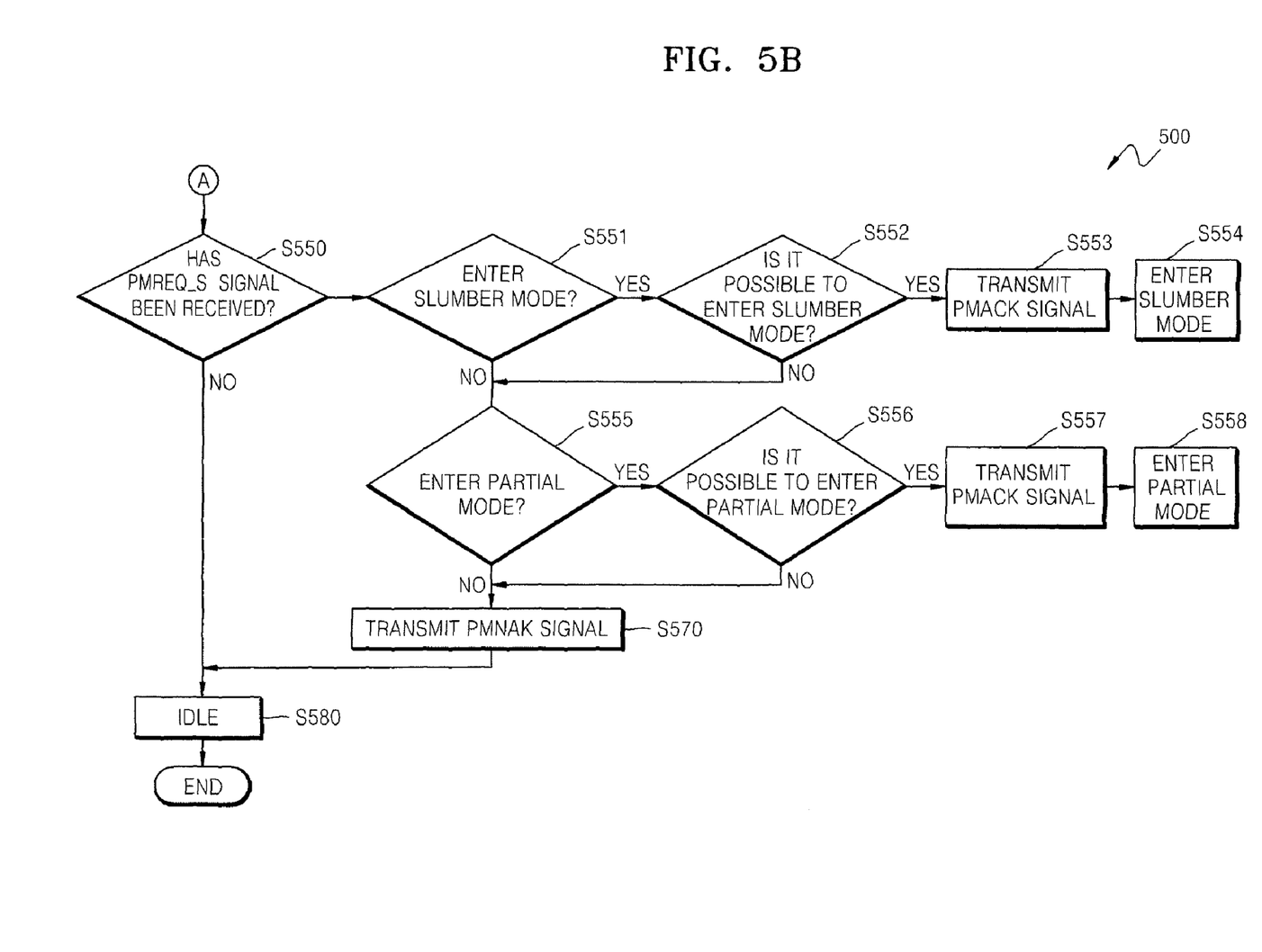

Referring to FIG. 5B, in the operations of the exemplary embodiment 500 of controlling a power saving mode, when PMREQ_S is received by the receiver, the receiver again decides whether to enter the slumber mode in operation S551 or to enter the partial mode in operation S555. When it is possible to enter the selected mode, the receiver enters into the corresponding power saving mode. As discussed above, the selected mode can be provided separately and independently from the mode requested by the transmitter. Therefore, even if the slumber mode is requested in operation S550 by the transmitter, the transmitter and the receiver can enter the partial mode in operation S558, and thereby, can further improve the wake-up response of the system.

If it is not possible to enter the selected mode, the operations of the exemplary embodiment 500 of controlling a power saving mode may try entering another mode. Also, in the operations of the exemplary embodiment 500 of controlling a power saving mode of FIG. 5B, a PMNAK signal is transmitted to the transmitter when any power saving mode is not selected or if it is not possible to enter any power saving mode, in operation S570.

Figure 6A:
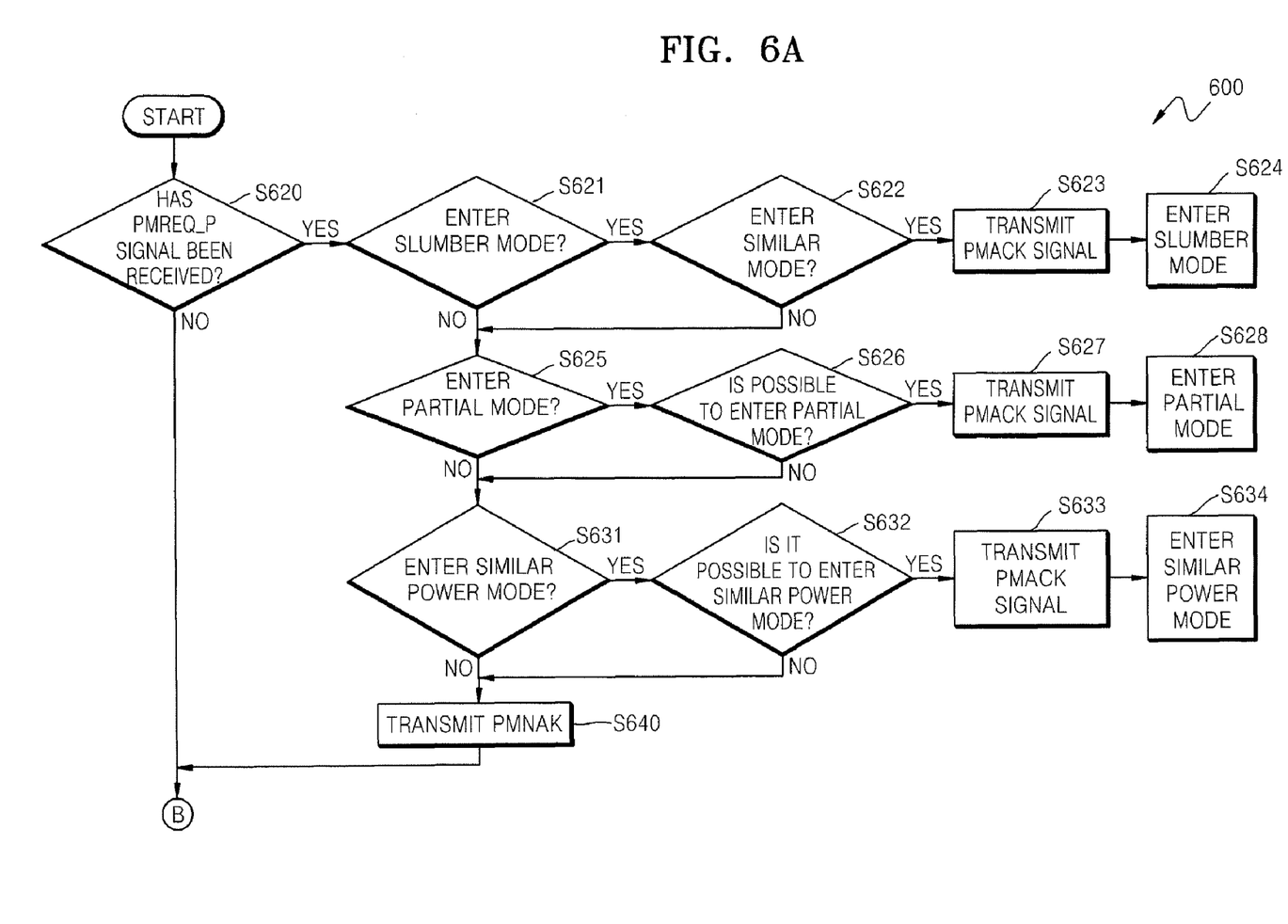
Figure 6B:
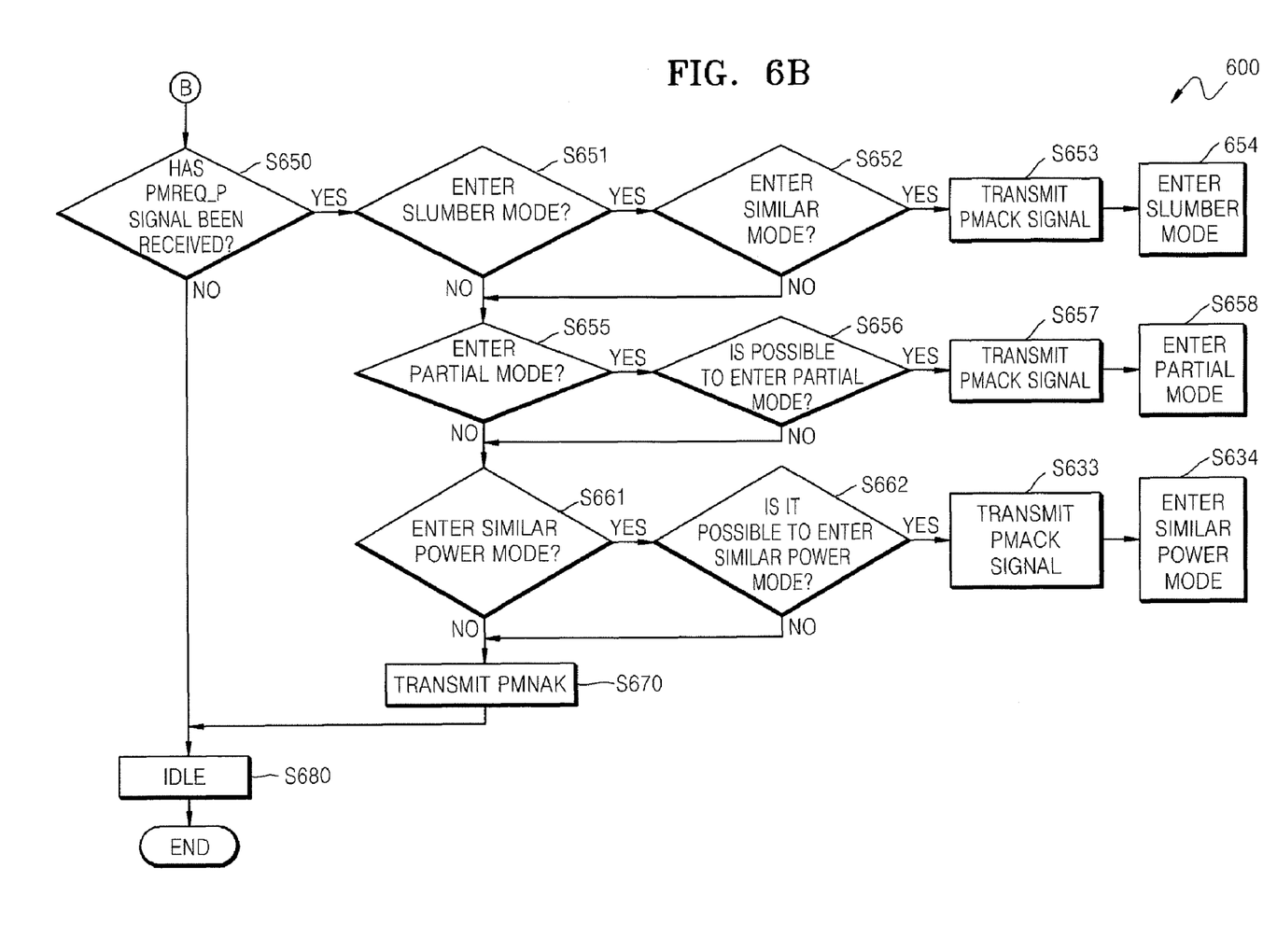

FIGS. 6A-6B illustrate operations of another exemplary embodiment 600 of controlling a power saving mode. The operations of the exemplary embodiment 600 of controlling a power saving mode of FIGS. 6A-6B are similar to the operations of the exemplary embodiment 500 of controlling a power saving mode of FIGS. 5A-5B. However, the exemplary embodiment 600 of controlling a power saving mode of FIGS. 6A-6B differs only in that a third power saving mode can be selected in addition to the partial mode and the slumber mode in the SATA protocol. In other words, in addition to the partial mode and the slumber mode that can be selected as illustrated in FIGS. 5A-5B, an additional third power mode referred to as a "similar power mode" can be selected in the embodiment of FIGS. 6A-6B.

The third power saving mode may be a mode to only turn off transmission and reception between the transmitter and the receiver. Hence, in the third power saving mode, data of the transmitter and the receiver or a control signal used for data transmission and reception therebetween is not transmitted or received, so as to electrically isolate the transmitter from the receiver. Thus, the third power saving mode can supply power to all PHY blocks except for blocks for transmission and reception between the transmitter and the receiver in order to prevent system malfunction due to a turn-on/off of the PHY block by entering/ending the power saving mode.

As discussed above, the third power saving mode is not defined in the SATA protocol. Therefore, the third power saving mode will be referred to as the similar power mode in the present embodiment. The operations of the exemplary embodiment 600 of controlling a power saving mode of FIGS. 6A-6B can realize a power saving mode optimized to the properties of the system as required by a user by selecting a user-defined power mode such as the similar power mode.

As described above, since error handling can be performed more stably in the similar power mode, the control signal is set to select the similar power mode when the system requires a more stable operation than the partial mode and the slumber mode.

The method of controlling a power saving mode according to the various embodiments of the present general inventive concept can operate in the power saving mode that is suitable for the required properties of the system in accordance with the SATA protocol by selecting a power saving mode independently of a power saving mode requested by the transmitter.

Figure 7:
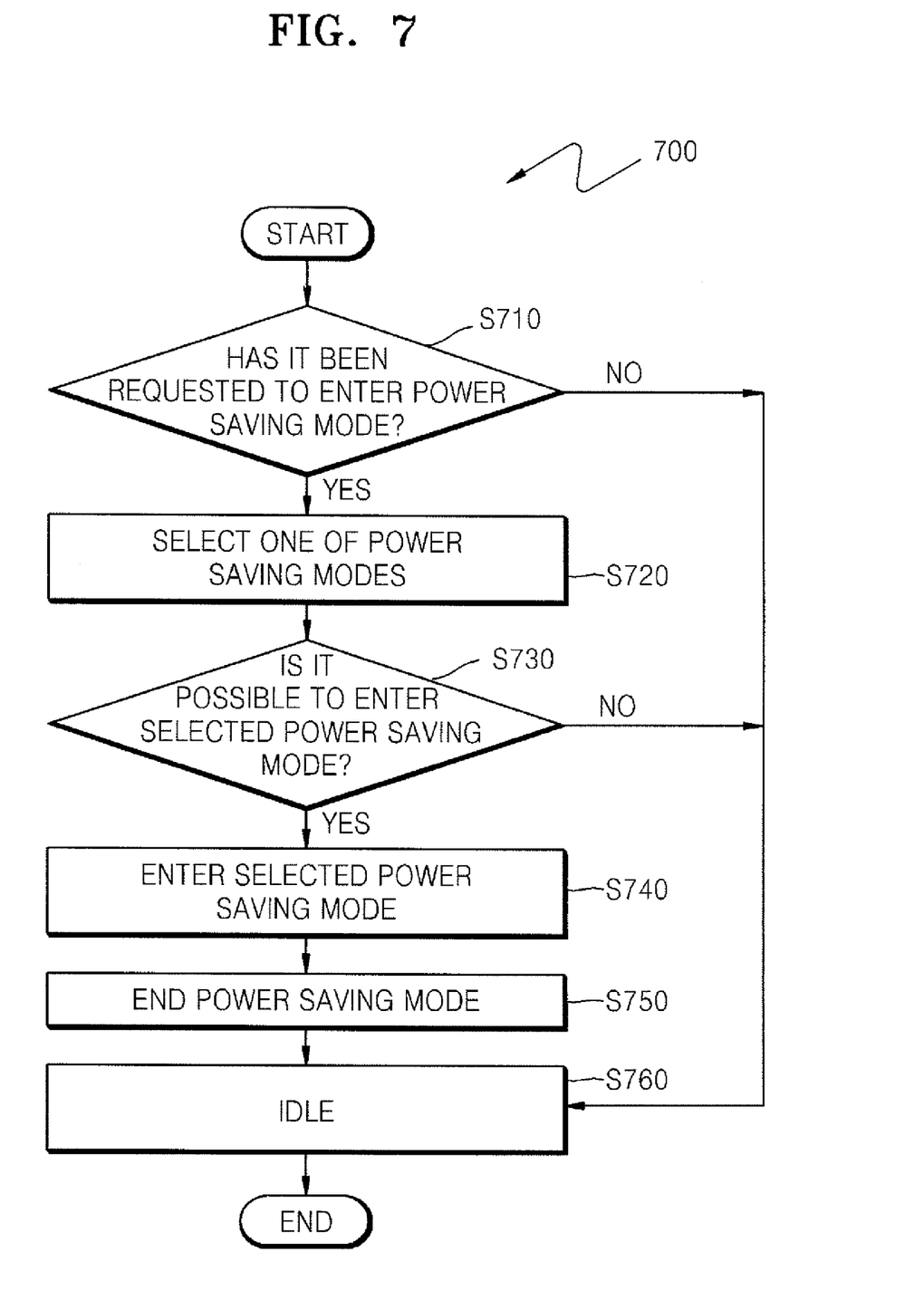
FIG. 7 is a flowchart of a power management method according to an embodiment of the present general inventive concept.

FIG. 7 is a flowchart illustrating a power management method 700 according to an embodiment of the present general inventive concept.

Referring to FIG. 7, according to the power management method 700, in a SATA interface method for data transmission between a transmitter and a receiver, the receiver determines whether the transmitter has requested the receiver to enter one of the power saving modes in a SATA protocol in operation S710. If the receiver determines that the transmitter has requested to enter into one of the power saving modes, then in operation S720, the receiver selects one of the power saving modes. In operation S730, the receiver checks whether it is possible to enter a selected power saving mode, which may be different from the power saving mode requested by the transmitter. If it is possible to enter the selected power saving mode, the receiver and the transmitter enter the selected power saving mode, in operation S740.

The power management method 700 according to the present embodiment may further include operation S750 for ending the power saving mode or operation S760 for entering an idle mode when it is not possible to enter the selected power saving mode.

The power management method 700 according to the present embodiment is similar to the method 600 of controlling the power saving mode described above, with the addition of the operations S750 and S760 described above. Therefore, the power management method 700 will be understood by one of ordinary skill in the art, and thus, a detailed description thereof will not be given.

As described above, in methods of controlling a power saving mode in a SATA interface according to the various embodiments described herein, since a power saving mode can be selected independently of a power saving mode requested by a transmitter, a system can operate in a power saving mode suitable for the required properties of the system in accordance with a SATA protocol. Furthermore, the properties of the system as required by a user can be realized by selecting a user-defined power saving mode.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of controlling a power saving mode used in a serial advanced technology attachment (SATA) interface for data transmission between a transmitter and a receiver, the method comprising:
   transmitting a request to the receiver to enter a first power saving mode, the first power saving mode being one of a plurality of power saving modes in a SATA protocol by the transmitter, the request designating one of the plurality of power saving modes in the SATA protocol; and
   selecting a second power saving mode, the second power saving mode being one of the power saving modes selected independently from the request by the receiver, the second power saving mode being a power saving mode to consume less power than the first power saving mode and to have a wake-up time longer than the first power saving mode.

2. The method of claim 1, wherein in the request includes a request to enter one of the first, the second and a third power saving modes.

3. The method of claim 1, wherein the first power saving mode is a partial mode.

4. The method of claim 1, wherein the second power saving mode is a slumber mode.

5. The method of claim 2, wherein the third power saving mode is a mode for turning off only transmission and reception between the transmitter and the receiver.

6. The method of claim 5, wherein the third power saving mode is the power saving mode for when the system requires a more stable operation than the first and second power saving modes.

7. The method of claim 1, further comprising checking whether it is possible to enter the second power saving mode by the receiver.

8. The method of claim 7, wherein the checking of whether it is possible to enter the second power saving mode comprises:
   transmitting a first signal in the SATA protocol to the transmitter using the receiver when it is possible to enter the second power saving mode; and
   entering the second power saving mode.

9. The method of claim 8, further comprising:
   checking whether it is possible to enter the first power saving mode when it is not possible to enter the second power saving mode;
   transmitting the first signal to the transmitter using the receiver when it is possible to enter the first power saving mode; and
   entering the first power saving mode.

10. The method of claim 8, further comprising:
    transmitting a second signal in the SATA protocol to the transmitter by the receiver when it is not possible to enter the first power saving mode; and
    entering an idle mode.

11. The method of claim 8, further comprising;
    checking whether it is possible to enter another power saving mode when it is not possible to enter the first power saving mode;
    transmitting the first signal to the transmitter using the receiver when it is possible to enter the other power saving mode and entering the other power saving mode; and
    transmitting the second signal to the transmitter using the receiver when it is not possible to enter the other power saving mode and entering an idle mode.

12. The method of claim 1, wherein the transmitter and the receiver are a host and a device, or a device and a host, respectively.

13. The method of claim 12, wherein the device is one of a flash memory device and a hard disk drive.

14. The method of claim 1, further comprising;
    transmitting a request to the receiver to enter the second power saving mode using the transmitter;
    checking whether it is possible to enter the second power saving mode; and
    checking whether it is possible to enter the first power saving mode when it is not possible to enter the second power saving mode.

15. A power management method used in a serial advanced technology attachment (SATA) interface for data transmission between a transmitter and a receiver, the method comprising:
- transmitting a request the receiver to enter one of a plurality of power saving modes in a SATA protocol using the transmitter, the request designating one of the plurality of power saving modes including a first power saving mode in the SATA protocol;
- selecting the first power saving modes independently from the request using the receiver, power consumption of the first power saving mode being the least among the plurality of power saving modes and a wake-up time of the first power saving mode being the longest among the plurality of power saving modes;
- checking whether it is possible to enter the selected power saving mode; and
- entering the selected power saving mode when it is possible to enter the selected power saving mode.

16. A power management method used in a serial advanced technology attachment (SATA) interface for data transmission between a transmitter and a receiver, the method comprising:
- determining whether a request by the transmitter has been made to enter one of a plurality of power saving modes in a SATA protocol, the request designating one of the plurality of power saving modes in the SATA protocol;
- determining whether an independent selection of a power mode has been made; and
- entering one of the power modes from the requested power modes of the transmitter and the independently selected power mode based on a condition of the SATA protocol, power consumption of the independently selected power mode being the least among the plurality of power saving modes and a wake-up time of the independently selected power mode being the longest among the plurality of power saving modes.

17. The method of claim 16, wherein the independent selection of a power mode is made in response to a control signal received by the receiver.

18. An apparatus with a serial advanced technology attachment (SATA) interface, the apparatus comprising:
- a receiving unit configured to receive a request to enter a first power saving mode, the first power saving mode being one of a plurality of power saving modes in a SATA protocol, the request designating one of a plurality of power saving modes in a SATA protocol; and
- a processor configured to, in response to the request, select a second power saving mode, the second power saving mode being one of the power saving modes selected independently from the request, the second power saving mode being a power saving mode to consume less power than the first power saving mode and to have a wake-up time longer than the first power saving mode.

19. The apparatus of claim 18, the apparatus further comprising:
- a transmitting unit configured to transmit a signal indicating whether one of the power saving modes is acknowledged based on the determination to select.

20. The apparatus of claim 18, wherein the selection of one of the power saving modes is determined by properties of the apparatus or a system connected to the apparatus.

21. The apparatus of claim 20, wherein the properties include an amount of power saving, a wake-up response, stability of an operation or a combination thereof.

* * * * *